United States Patent
Ito et al.

(10) Patent No.: US 6,761,966 B2
(45) Date of Patent: Jul. 13, 2004

(54) HEAT-SHRINKABLE POLYESTER FILMS

(75) Inventors: Hideki Ito, Inuyama (JP); Norimi Tabota, Inuyama (JP); Hiroshi Nagano, Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 126 days.

(21) Appl. No.: 10/161,829

(22) Filed: Jun. 4, 2002

(65) Prior Publication Data

US 2003/0050430 A1 Mar. 13, 2003

(30) Foreign Application Priority Data

Jun. 5, 2001 (JP) ........................................ 2001-169977

(51) Int. Cl.[7] .............................. B32B 7/02; C08F 20/00
(52) U.S. Cl. ....................... 428/221; 525/437; 525/439; 525/444; 525/445; 428/357
(58) Field of Search ................................ 525/437, 439, 525/445; 428/221, 357

(56) References Cited

U.S. PATENT DOCUMENTS 4,274,900 A * 6/1981 Mueller et al. ............. 156/229

2002/0090502 A1 * 7/2002 Ito et al. ................... 428/304.4

FOREIGN PATENT DOCUMENTS

| EP | 1 024 162 | 8/2000 |
|---|---|---|
| JP | 2000 135738 | 5/2000 |

* cited by examiner

Primary Examiner—Samuel A. Acquah
(74) Attorney, Agent, or Firm—Kenyon & Kenyon

(57) ABSTRACT

Heat-shrinkable polyester films, each having a heat shrinkability of 30% or higher after treatment in hot water at 85° C. for 10 seconds in the main shrinkage direction of the film, and 10% or lower after treatment in hot water at 85° C. for 10 seconds in a direction perpendicular to the main shrinkage direction of the film, the resistance to tear propagation in the direction perpendicular to the main shrinkage direction after the film has been shrunk at 10% in the main shrinkage direction of the film being 1500 mN or smaller, exhibit excellent shrinkage finish with only rare occurrence of wrinkles, shrinkage spots and strains by shrinkage and have excellent cut properties along perforations; therefore, these films are suitable for full labels on bottles, particularly for full labels on PET bottles.

6 Claims, No Drawings

HEAT-SHRINKABLE POLYESTER FILMS

FIELD OF INVENTION

The present invention relates to heat-shrinkable polyester films and, in particular, to heat-shrinkable polyester films suitable for label use. More specifically, it relates to heat-shrinkable polyester films for labels on bottles, which films will cause only rare occurrence of wrinkles, shrinkage spots and strains by heat shrinkage.

BACKGROUND OF THE INVENTION

For heat-shrinkable films, particularly heat-shrinkable films for labels on the barrels of bottles, there have mainly been used films made of polyvinyl chloride, polystyrene or other resins. However, for polyvinyl chloride, the evolution of a chlorine-containing gas in its incineration for disposal has become a problem, and for polyethylene, there is a problem that printing is difficult. Further, in the collection and recycling of polyethylene terephthalate (PET) bottles, labels of resins other than PET, such as polyvinyl chloride or polyethylene, should be separated. For these reasons, attention has been paid to heat-shrinkable films made of polyesters involving none of these problems.

In recent years, for the recycling of PET bottles for beverages, labels fitted on the bottles have usually been printed. They without being treated are not suitable for recycling, and therefore, they are often removed before the recycling of the bottles. In this connection, as the means to do so, they may be provided with perforations in a direction perpendicular to the main shrinkage direction.

However, conventional heat-shrinkable polyester films have relatively high resistance to tear propagation in a direction perpendicular to the main shrinkage direction, and they have fault in the cutting properties along perforations when fitted on bottles. Depending on the shapes of bottles or the forms of perforations, labels may be difficult to cut along perforations and may therefore become difficult to remove with bare hands.

Thus, in the case of labels on bottles, the conventional heat-shrinkable polyester films have unsatisfactory cutting properties along perforations.

SUMMARY OF THE INVENTION

The present invention, which can solve the above problems, has been made for the purpose of providing heat-shrinkable polyester films for labels on bottles, particularly for labels on PET bottles, which films will cause only rare occurrence of wrinkles, shrinkage spots and strains by shrinkage as well as which films have excellent tear properties in a direction perpendicular to the main shrinkage direction of the films.

Thus the present invention provides heat-shrinkable polyester films, each having a heat shrinkability of 30% or higher after treatment in hot water at 85° C. for 10 seconds in the main shrinkage direction of the film, and 10% or lower after treatment in hot water at 85° C. for 10 seconds in a direction perpendicular to the main shrinkage direction of the film, the resistance to tear propagation in the direction perpendicular to the main shrinkage direction after the films has been shrunk at 10% in the main shrinkage direction of the film being 1500 mN or smaller.

The heat shrinkability as used herein is defined as follows:

A film is cut into a square shape of 10 cm×10 cm and heat shrunk by immersion under no load in hot water at a prescribed temperature ±0.5° C. for a prescribed time and then measured for side lengths. The heat shrinkability is calculated in the respective directions from the measured values of side lengths by the following equation. The direction of either side corresponding to the larger value of heat shrinkability is referred to as the main shrinkage direction $$\text{Heat shrinkability} = \frac{\text{Side length before shrinkage} - \text{Side length after shrinkage}}{\text{Side length before shrinkage}} \times 100\,(\%)$$

The resistance to tear propagation as used herein is defined as follows:

A film previously shrunk at 10% is cut into a size of 51 mm in the machine direction×64 mm in the transverse direction, and measured with a light-load tear tester available from TOYO SEIKI SEISAKU-SHO, LTD. The values read from the tester are regarded as the resistance to tear propagation. This measurement is carried out for 5 different samples of each film, and their average value is calculated and presented.

The perforations for label cutting provided on the labels of PET bottles are usually formed in the direction perpendicular to the main shrinkage direction of the labels. The present inventors have found that there is a relation between the cutting properties along perforations and the resistance to tear propagation that lower resistance to tear propagation in the direction perpendicular to the main shrinkage direction of films or labels made of the films will provide more excellent cutting properties along perforations. The control of this relation made it possible to attain the above purpose.

In preferred embodiments, the above heat-shrinkable polyester films are made of polyesters comprising thermoplastic resins incompatible with the polyesters, which is preferred in that regardless of the shapes of bottles or the forms of perforations, there can be provided films and labels made of the films, having excellent cutting properties along perforations.

DETAILED DESCRIPTION OF THE INVENTION

The dicarboxylic acid components constituting polyesters used in the present invention may include aromatic dicarboxylic acids such as terephthalic acid, isophthalic acid, naphthalenedicarboxylic acid and o-phthalic acid; aliphatic dicarboxylic acids such as adipic acid, azelaic acid, sebacic acid and decanedicarboxylic acid; and alicyclic dicarboxylic acids.

When aliphatic dicarboxylic acids (e.g., adipic acid, sebacic acid, decanedicarboxylic acid) are contained, their contents may preferably be lower than 3 mol %. For heat-shrinkable polyester films obtained by the use of polyesters containing these aliphatic dicarboxylic acids at 3 mol % or higher, their film stiffness in the high-speed fitting is insufficient.

The polyesters may preferably contain no three or more functional polycarboxylic acids (e.g., trimellitic acid, pyromellitic acid, their anhydrides). For heat-shrinkable polyester films obtained by the use of polyesters containing these polycarboxylic acids, their desired high shrinkability can hardly be attained.

The diol components constituting the polyesters used in the present invention may include aliphatic diols such as ethylene glycol, propanediol, butanediol, neopentyl glycol and hexanediol; alicyclic diols such as 1,4-cyclohexanedimethanol; and aromatic diols.

The polyesters used in the heat-shrinkable polyester films of the present invention may preferably be those having glass transition temperatures (Tgs) adjusted to 60–75° C. by the incorporation of at least one diol of 3–6 carbon atoms (e.g., propanediol, butanediol, neopentyl glycol, hexanediol).

For the purpose of obtaining heat-shrinkable polyester films exhibiting particularly excellent shrinkage finish, neopentyl glycol may preferably be used as one of the diol components.

The polyesters may preferably contain neither diols of 8 or more carbon atoms (e.g., octanediol), nor three or more functional polyhydric alcohols (e.g., trimethylolpropane, trimethylolethane, glycerin, diglycerin). For heat-shrinkable polyester films obtained by the use of polyesters containing these diols or polycarboxylic acids, their desired high shrinkability can hardly be attained.

The polyesters may preferably contain none of diethylene glycol, triethylene glycol, and polyethylene glycol, if possible. In particular, diethylene glycol may easily be formed as a by-product component in the polymerization of polyesters and therefore may easily be contained in the polyesters. For the polyesters used in the present invention, the diethylene glycol contents may preferably be lower than 4 mol %.

When two or more polyesters are used in admixture, the acid component contents and the diol component contents of the mixed polyesters refer to the contents, relative to the total amount of all acid components and the total amount of all diol components, respectively, both of which are contained in the mixed polyesters, independently of whether or not transesterification has been carried out after the mixing.

Further, to improve the self-lubricating properties of heat-shrinkable polyester films, inorganic lubricants such as titanium dioxide, fumed silica, kaolin and calcium carbonate; or organic lubricants such as long-chain fatty acid esters may preferably be added. The heat-shrinkable polyester films of the present invention may further contain, if necessary, additives such as stabilizers, colorants, antioxidants, defoamers, antistatic agents and ultraviolet light absorbers.

The above polyesters can be prepared by polymerization according to the conventional methods; for example, the polyesters can be obtained direct esterification method in which dicarboxylic acids are directly reacted with diols or transesterification method in which dicarboxylic acid dimethyl esters are reacted with diols. The polymerization may be carried out in either of batch or continuous manner.

Further, to reduce the resistance to tear propagation, for example, at least one thermoplastic resin incompatible with the above polyesters should be incorporated in the films. The incorporation of polymers incompatible with the above polyesters forms a phase-separation structure in the films, thereby making it possible to attain films having good tear properties. Examples of the polymers incompatible with the above polyesters may include α-olefin resins such as polypropylene and polyethylene, polystyrene resins, polymethylpentene resins, ionomer resins, acrylic resins, polycarbonate resins, and polysulfone resins.

The incompatible polymers may preferably have a melt flow rate (MFR) of 20 g/min. (at 260° C.–5 kg) or lower, more preferably 15 g/10 min. (260° C.–5 kg) or lower. When MFR is higher than 20 g/10 min. (260° C.–5 kg), the phase-separation structure in the films will become insufficient, which is not preferred because of a decrease in the improvement of the cutting properties along perforations.

The amounts of thermoplastic resins to be incorporated, which are incompatible with the above polyesters, are preferably 15 wt % or higher, more preferably 18 wt % or higher, based on the total amount of the polyesters and the thermoplastic resins. When the thermoplastic resins are in amounts of lower than 15 wt %, the phase-separation structure in the films becomes insufficient, so that a reduction in tear resistance cannot come to a practical level, which is not preferred.

For the heat-shrinkable polyester films of the present invention, the heat shrinkability as calculated from the values of side length before and after shrinkage by treatment in hot water under no load according to the equation: heat shrinkability=((side length before shrinkage–side length after shrinkage)/side length before shrinkage)×100 (%) should be 30% or higher, preferably 35% or higher, after treatment in hot water at 85° C. for 10 seconds in the main shrinkage direction of a film, and 10% or lower, preferably 6% or lower, after treatment in hot water at 85° C. for 10 seconds, in a direction perpendicular to the main shrinkage direction of the film.

When the heat shrinkability after treatment in hot water at 85° C. for 10 seconds in the main shrinkage direction of a film is lower than 30%, there will easily occur insufficient shrinkage when the film is used as labels on bottles, which is not preferred.

When the heat shrinkability after treatment in hot water at 85° C. for 10 seconds in a direction perpendicular to the main shrinkage direction of a film is higher than 10%, labels made of such a film will easily cause deviation in height, which is also not preferred.

The resistance to tear propagation in a direction perpendicular to the main shrinkage direction of a film is 1500 mN or lower, preferably 1200 mN or lower, and more preferably 1000 mN or lower. This makes labels made of such a film after fitted on bottles have good cut properties along perforations. When the resistance to tear propagation is higher than 1500 mN, labels made of such a film will hardly be cut along perforations, easily resulting in the case where the labels become difficult to remove from bottles with bare hands.

For the heat-shrinkable polyester films of the present invention, the film thickness is not particularly limited, but may preferably be 10–200 μm, more preferably 20–100 μm, as the heat-shrinkable films for labels.

The process for producing the heat-shrinkable polyester films of the present invention will be explained below by a specific example; however, it is not limited to this production process.

The polyester raw materials used in the present invention are dried with a dryer such as a hopper dryer or a paddle dryer, or a vacuum dryer, and melt extruded into a film shape at a temperature of 200–300° C. In the extrusion, any of the conventional methods may be employed, including T-die method and tubular method. After the extrusion, rapid cooling provides an unstretched film.

The resulting unstretched film is then stretched at a ratio of 3.0 or higher, preferably 3.5 or higher, in the transverse direction.

If necessary, the stretched film is then heat treated at a temperature of 70–100° C. to give a heat-shrinkable polyester film.

The method of stretching may involve uniaxial stretching only in the transverse direction (TD) with a tenter, in which case the film can additionally be stretched in the machine direction (MD) to attain biaxial stretching. Such biaxial stretching may be achieved by any of the sequential or simultaneous biaxial stretching method, and the film may further be stretched, if necessary, in the machine or transverse direction.

For attaining the purpose of the present invention, the transverse direction (i.e., the direction perpendicular to the direction of extrusion) is practical as the main shrinkage direction of a film; therefore, the above explanation is for an example of the film formation when the main shrinkage direction of the film is taken as the transverse direction. However, the film formation in which the main shrinkage direction of the film is taken as the machine direction (i e., the direction of extrusion) can also be carried out substantially in the same manner as described above, except that the direction of stretching is turned 90 degrees around the line perpendicular to the film surface.

In particular, when at least one thermoplastic resin incompatible with the polyesters is incorporated, the following process of production is preferred.

The thermoplastic resins incompatible with the polyesters may preferably be mixed just before incorporation into an extruder, if possible. This process makes it possible to prevent the segregation of the polyesters and the incompatible thermoplastic resins, thereby attaining stable characteristics.

EXAMPLES

The present invention will hereinafter be further illustrated by some examples and comparative examples; however, the present invention is not limited to these examples.

The heat-shrinkable polyester films of the present invention were evaluated by the following methods.

(1) Heat Shrinkability

A film was cut into a square shape of 10 cm×10 cm and heat shrunk by immersion under no load in hot water at a prescribed temperature ±0.5° C. for a prescribed time and then measured for side lengths. The heat shrinkability was calculated in the respective directions from the measured values of side lengths by the following equation. The direction of either side corresponding to the larger value of heat shrinkability was referred to as the main shrinkage direction.

$$\text{Heat shrinkability} = \frac{\text{Side length before shrinkage} - \text{Side length after shrinkage}}{\text{Side length before shrinkage}} \times 100 \, (\%)$$

(2) Shrinkage Finish

A film was printed with three inks of glass, gold and white colors, and formed into a cylindrical label of 10.8 cm in folding diameter (i.e., length in the width direction when the label was folded flat) and 6.1 cm in height by heat sealing.

The label was fitted on a 500-mL PET bottle (20.6 cm in height and 6.5 cm in barrel diameter; the same bottle as used for "UMACHA" from ASAHI SOFT DRINKS CO., LTD.), and heat shrunk by allowing the labeled glass bottle to pass through a steam tunnel (model SH-1500-L) available from FUJI ASTEC, INC., at a zone temperature of 85° C. for a passage time of 2.5 seconds. This testing was carried out for 20 different samples of each film.

The evaluation was carried out by visual observation and the criteria were as follows:
Good: no occurrence of wrinkles, jumping and insufficient shrinkage;
Poor: occurrence of wrinkles, jumping or insufficient shrinkage.

(3) Resistance to Tear Propagation

A film previously shrunk at 10% was cut into a size of 51 mm in the machine direction×64 mm in the transverse direction, and measured with a light-load tear tester available from TOYO SEIKI SEISAKU-SHO, LTD. The values read from the tester was regarded as the resistance to tear propagation. This measurement was carried out for 5 different samples of each film.

(4) Intrinsic Viscosity

A sample of 200 mg in weight was added to a mixture of phenol and tetrachloroethane (50:50 wt %) in 20 ml, and the mixture was then heated at 110° C. for 1 hour, followed by measurement of intrinsic viscosity at 30° C.

(5) Cutting Properties Along Perforations

From a heat-shrinkable film, a cylindrical label of 10.8 cm in folding diameter and 15.1 cm in height by means of heat sealing and then provided with continuous perforations of 1 mm in hole diameter and 2 mm in hole distance along the direction perpendicular to the main shrinkage direction.

The label was fitted on a 500-mL PET bottle (20.6 cm in height and 6.5 cm in barrel diameter; the same bottle as used for "UMACHA" from ASAHI SOFT DRINKS CO., LTD.), and heat shrunk by allowing the labeled glass bottle to pass through a steam tunnel (model SH-1500-L) available from FUJI ASTEC, INC., at a zone temperature of 85° C. for a passage time of 2.5 seconds. This testing was carried out for 20 different samples of each film.

The sensory evaluation was carried out, in which the label fitted on the PET bottle was cut by the hand from the upper end or lower end of the perforations and the criteria were as follows:
Good: the label could be cut along the perforations without a break of label cutting in the middle thereof;
Poor: the label was difficult to cut along the perforations with a break of label cutting in the middle thereof.

The polyesters used in the examples and comparative examples were as follows:
Polyester A: polyethylene terephthalate (intrinsic viscosity (IV), 0.75 dl/g)
Polyester B: a polyester composed of 70 mol % ethylene glycol and 30 mol % neopentyl glycol and terephthalic acid (IV, 0.72 dl/g)
Polyester C: polybutylene terephthalate (IV, 1.20 dl/g)
Polyester D: 50 wt % polyethylene terephthalate and 50 wt % titanium oxide particles

Example 1

A polyester resin consisting of 17 wt % polyester A, 53 wt % polyester B, 10 wt % polyester C, and 20 wt % polymethylpentene ("TPX DX845" available from MITSUI CHEMICALS, INC.) was melt extruded from a T-die at 280° C., followed by rapid cooling on chill rolls, to give an unstretched film.

The unstretched film was pre-heated until the film temperature came to 80° C., and then stretched at a ratio of 4 in the transverse direction with a tenter at 76° C. to give a heat-shrinkable polyester film of 45 µm in thickness.

Example 2

A polyester resin consisting of 17 wt % polyester A, 53 wt % polyester B, 10 wt % polyester C, and 20 wt % polystyrene ("G797N" available from JAPAN POLYSTYRENE, INC.) was melt extruded from a T-die at 280° C., followed by rapid cooling on chill rolls, to give an unstretched film.

The unstretched film was treated in the same manner as described in Example 1 to give a heat-shrinkable polyester film of 45 μm in thickness.

Example 3

A polyester resin consisting of 7 wt % polyester A, 53 wt % polyester B, 10 wt % polyester C, 10 wt % polyester D, and 20 wt % polypropylene ("F102WC" available from GRAND POLYMER CO., LTD) was melt extruded from a T-die at 280° C., followed by rapid cooling on chill rolls, to give an unstretched film.

The unstretched film was treated in the same manner as described in Example 1 to give a heat-shrinkable polyester film of 45 μm in thickness.

Example 4

A polyester resin consisting of 17 wt % polyester A, 53 wt % polyester B, 10 wt % polyester C, and 20 wt % polystyrene, which is the same as used in Example 2, was melt extruded from a T-die at 280° C., followed by rapid cooling on chill rolls, to give an unstretched film.

The unstretched film was treated in the same manner as described in Example 1 to give a heat-shrinkable polyester film of 45 μm in thickness.

Example 5

A polyester resin consisting of 17 wt % polyester A, 53 wt % polyester B, 10 wt % polyester C, and 20 wt % ionomer ("HI-MILAN 1706" available from MITSUI CHEMICALS, INC.) was melt extruded from a T-die at 280° C., followed by rapid cooling on chill rolls, to give an unstretched film.

The unstretched film was treated in the same manner as described in Example 1 to give a heat-shrinkable polyester film of 45 μm in thickness.

Example 6

A polyester resin consisting of 17 wt % polyester A, 63 wt % polyester B, and 20 wt % polymethylpentene ("TPX DX845" available from MITSUI CHEMICALS, INC.) was melt extruded from a T-die at 280° C., followed by rapid cooling on chill rolls, to give an unstretched film.

The unstretched film was treated in the same manner as described in Example 1 to give a heat-shrinkable polyester film of 80 μm in thickness.

Comparative Example 1

A polyester resin consisting of 35 wt % polyester A, 55 wt % polyester B, and 10 wt % polyester C was melt extruded from a T-die at 280° C., followed by rapid cooling on chill rolls, to give an unstretched film.

The unstretched film was treated in the same manner as described in Example 1 to give a heat-shrinkable polyester film of 45 μm in thickness.

Comparative Example 2

A polyester resin consisting of 10 wt % polyester A, 65 wt % polyester B, and 25 wt % polyester C was melt extruded from a T-die at 280° C., followed by rapid cooling on chill rolls, to give an unstretched film.

The unstretched film was pre-heated until the film temperature came to 90° C., and then stretched at a ratio of 4 in the transverse direction with a tenter at 73° C. to give a heat-shrinkable polyester film of 45 μm in thickness.

Comparative Example 3

A polyester resin consisting of 25 wt % polyester A, 50 wt % polyester B, and 25 wt % polyester C was melt extruded from a T-die at 280° C., followed by rapid cooling on chill rolls, to give an unstretched film.

The unstretched film was pre-heated until the film temperature came to 88° C., and then stretched at a ratio of 4 in the transverse direction with a tenter at 72° C. to give a heat-shrinkable polyester film of 45 μm in thickness.

Comparative Example 4

A polyester resin consisting of 15 wt % polyester A, 75 wt % polyester B, and 10 wt % polyester C was melt extruded from a T-die at 280° C., followed by rapid cooling on chill rolls, to give an unstretched film.

The unstretched film was pre-heated until the film temperature came to 87° C., and then stretched at a ratio of 5 in the transverse direction with a tenter at 83° C. to give a heat-shrinkable polyester film of 50 μm in thickness.

For the films obtained in Examples 1–6 and Comparative Examples 1–4, the raw materials and conditions of film formation are listed in Tables 1 and 2, and the results of evaluation are shown in Table 2.

TABLE 1

| | Raw materials (wt %) | | | | | | | |
|---|---|---|---|---|---|---|---|---|
| | Polyester A | Polyester B | Polyester C | Polyester D | PMP | PS | PP | IO |
| Example 1 | 17 | 53 | 10 | — | 20 | — | — | — |
| Example 2 | 17 | 53 | 10 | — | — | 20 | — | — |
| Example 3 | 7 | 53 | 10 | 10 | — | — | 20 | — |
| Example 4 | 17 | 53 | 10 | — | — | 20 | — | — |
| Example 5 | 17 | 53 | 10 | — | — | — | — | 20 |
| Example 6 | 17 | 63 | — | — | 20 | — | — | — |
| Comp. Ex. 1 | 35 | 55 | 10 | — | — | — | — | — |
| Comp. Ex. 2 | 10 | 65 | 25 | — | — | — | — | — |

TABLE 1-continued

|  | Raw materials (wt %) | | | | | | | |
|---|---|---|---|---|---|---|---|---|
|  | Polyester A | Polyester B | Polyester C | Polyester D | PMP | PS | PP | IO |
| Comp. Ex. 3 | 25 | 50 | 25 | — | — | — | — | — |
| Comp. Ex. 4 | 15 | 75 | 10 | — | — | — | — | — |

Polyester A: TPA//EG = 100//100 (mol %)
Polyester B: TPA//EG/NPG = 100//70/30 (mol %)
Polyester C: TPA//BD = 100//100 (mol %)
Polyester D: Polyester A//titanium dioxide particles = 50//50 (wt %)
PMP: polymethylpentene
PS: polystyrene
PP: polypropylene
IO: ionomer

TABLE 2

|  | Conditions of film formation | | Heat shrinkability | | Shrinkage finish | Resistance to tear propagation (mN) | Cutting properties along perforations |
|---|---|---|---|---|---|---|---|
|  | Stretch ratio (times) | Stretching temperature (° C.) | (%) 85° C. TD | MD | | | |
| Example 1 | 4.0 | 76 | 59 | 1 | good | 640 | good |
| Example 2 | 4.0 | 76 | 55 | 0 | good | 1040 | good |
| Example 3 | 4.0 | 76 | 53 | 1 | good | 1250 | good |
| Example 4 | 4.0 | 76 | 50 | 1 | good | 920 | good |
| Example 5 | 4.0 | 76 | 59 | −1 | good | 1480 | good |
| Example 6 | 4.0 | 76 | 58 | 0 | good | 630 | good |
| Comp. Ex. 1 | 4.0 | 76 | 54 | 3 | good | unmeasurable | poor |
| Comp. Ex. 2 | 4.0 | 73 | 65 | 0 | good | unmeasurable | poor |
| Comp. Ex. 3 | 4.0 | 72 | 66 | 2 | good | unmeasurable | poor |
| Comp. Ex. 4 | 5.0 | 83 | 78 | 0 | good | 3600 | poor |

As can be seen from Table 2, all the films obtained in Examples 1–6 exhibited good shrinkage finish and had excellent tear properties in a direction perpendicular to the main shrinkage direction. The heat-shrinkable polyester films of the present invention have high quality and high practical availability, and therefore, they are particularly suitable for shrinkable labels.

On the other hand, the heat-shrinkable films obtained in Comparative Examples 1–4 had poor tear properties in a direction perpendicular to the main shrinkage direction. Thus all the heat-shrinkable polyester films obtained in Comparative Examples had low quality and low practical availability.

According to the present invention, heat-shrinkable polyester films suitable for full labels on bottles, particularly for full labels on PET bottles can be obtained.

The heat-shrinkable polyester films of the present invention can exhibit good finish with only rare occurrence of wrinkles, shrinkage spots, strains and insufficient shrinkage by heat shrinkage when used as labels on bottles, as well as they have excellent tear properties, i.e., cut properties along perforations, in a direction perpendicular to the main shrinkage direction of the films; and therefore, they are very useful for labels on bottles.

Further, the incorporation of at least one thermoplastic resin incompatible with the polyesters provides some advantages, for example, in that there becomes no need to form special perforations on the labels.

What is claimed is:

1. A heat-shrinkable polyester film having a heat shrinkability of 30% or higher after treatment in hot water at 85° C. for 10 seconds in the main shrinkage direction of the film, and 10% or lower after treatment in hot water at 85° C. for 10 seconds in a direction perpendicular to the main shrinkage direction of the film, the resistance to tear propagation in the direction perpendicular to the main shrinkage direction after the film has been shrunk at 10% in the main shrinkage direction of the film being 1500 mN or smaller.

2. A heat-shrinkable polyester film according to claim 1, wherein the film is made of a polyester comprising a thermoplastic resin incompatible with the polyester resin.

3. The heat-shrinkable polyester film of claim 2 wherein the thermoplastic resin incompatible with the polyester resin has a melt flow rate less than about 20 g/10 mm measured at 260° C. with a 5 kg load.

4. The heat-shrinkable polyester film of claim 2 wherein the amount of comprises at thermoplastic resin incompatible with the polyester resin is at least about 15 wt-%.

5. The heat shrinkable film of claim 2 wherein the thermoplastic resin incompatible with the polyester resin is selected from the group consisting of α-olefin resins, polystyrene resins, polymethylpentene resins, ionomer resins, scrylic resins, polycarbonate resins, and polysulfone resins.

6. The heat shrinkable film of claim 5 wherein the α-olefin resin is selected from polypropylene and polyethylene.

* * * * *

UNITED STATES PATENT AND TRADEMARK OFFICE
CERTIFICATE OF CORRECTION

PATENT NO.   : 6,761,966 B2
DATED        : July 13, 2004
INVENTOR(S)  : Hideki Ito et al.

Page 1 of 1

It is certified that error appears in the above-identified patent and that said Letters Patent is hereby corrected as shown below:

Column 10,
Line 61, change "scrylic" to -- acrylic --.

Signed and Sealed this

Sixteenth Day of August, 2005

JON W. DUDAS
*Director of the United States Patent and Trademark Office*